United States Patent
Sosnowski

[11] 3,802,760
[45] Apr. 9, 1974

[54] DEVICES FOR VARYING THIN FILM WAVEGUIDING PROPERTIES

[75] Inventor: Thomas Patrick Sosnowski, Colts Neck, N.J.

[73] Assignee: Bell Telephone Laboratories Incorporated, Murray Hill, Berkeley Heights, N.J.

[22] Filed: Apr. 3, 1972

[21] Appl. No.: 240,481

Related U.S. Application Data

[63] Continuation-in-part of Ser. No. 157,988, June 29, 1971, abandoned.

[52] U.S. Cl. 350/96 WG, 350/150, 350/160 LC
[51] Int. Cl. G02b 5/14, G02f 1/26
[58] Field of Search 350/96 WG, 160 LC, 150

[56] References Cited
UNITED STATES PATENTS
| | | | |
|---|---|---|---|
| 3,311,845 | 3/1967 | Koester | 350/96 WG UX |
| 3,589,794 | 6/1971 | Marcatili | 350/96 WG |
| 3,695,745 | 10/1972 | Furukawa | 350/96 WG |

OTHER PUBLICATIONS

Wang et al., "Studies of Magnetooptic Effects for Thin–Film Optical–Waveguide Applications" IEEE Transactions on Magnetics Vol. Mag-7, No. 3, Sept. 1971, pp. 385–387.

*Primary Examiner*—John K. Corbin
*Attorney, Agent, or Firm*—E. W. Adams, Jr.

[57] ABSTRACT

Operations such as modulation, switching, mode conversion and the like are performed on light propagating in a thin film waveguide by a liquid crystal member overlaying a portion of the waveguide. The material of the crystal is such that its index of refraction in the direction of wave propagation, and normal thereto, is varied by application of an electric field, thereby producing a variation in the waveguiding properties of the waveguide. Using the same principles, mode filtering is achieved by overlaying a portion of the waveguide with an anisotropic material.

4 Claims, 2 Drawing Figures

PATENTED APR 9 1974 3,802,760

DEVICES FOR VARYING THIN FILM WAVEGUIDING PROPERTIES

BACKGROUND OF THE INVENTION

This is a continuation-in-part of application Ser. No. 157,988, filed June 29, 1971, now abandoned.

This invention relates to thin film optical waveguides, and, more particularly, to optical modulating, switching and mode filtering devices for use with such guides.

The adaptation of integrated circuit techniques to the optical frequency spectrum for use in optical communication, data processing, and other such systems has been the subject of considerable interest and activity. Miniaturization, minimization of ambient effects (such as vibration and thermal effects), reproducibility and reliability at reasonable cost are all desiderata realizable with integrated optical circuitry.

Thin film waveguides are a basic building block in such circuitry, and have led to numerous new applications in the laser and electro-optic fields. Despite the obvious utility of thin film guides, it has, heretofore, been difficult to perform certain operations on the light propagating in the guide, such as modulating, switching, pulsing, mode conversion and filtering.

In general, most of these operations have been performed in one of two ways. One method consists of extraction of the light from the guide, passage of the light through the device which performs the desired operation and reintroduction of the light into the thin film waveguide. Modulation and other operations can be accomplished by passing the light through an electro-optic medium, which alters the plane of polarization of the light passing therethrough. Other arrangements rely on variations in the transparency of the device through which the light passes, in accordance with applied signals. All such arrangements, in addition to the obvious problem of extracting and reintroducing light into the guide, depend upon a high degree of transparency to the light for efficient operation.

The second method for accomplishing various operations on the light in the guide calls for the inclusion of an electro-optic device, such as a semiconductor junction device. This semiconductor junction is generally formed at the same time the thin film guide is formed and itself forms a portion of the guide. Electrical signals applied across the junction produce electro-optic effects, such as polarization rotation, on the light passing therethrough, which affect the waveguiding properties of the waveguide. Such junction devices also require a high degree of light transmissivity for efficient operation, as well as a close match between the guiding characteristics of the junction and the thin film. In addition, the junction, being permanently incorporated into the guide, restricts flexibility in locating the modulating device in the system.

SUMMARY OF THE INVENTION

The present invention accomplishes operations on the optical wave in a thin film waveguide without necessitating extraction of the light from the guide and without being permanently affixed to, or integral with, the guide.

One of the devices of the present invention comprises a nematic liquid crystal member overlying the thin film waveguide and having a pair of electrodes for applying the modulating or switching signal to the crystal itself. The operation of the device is based upon the fact that the index of refraction of a thin film waveguide must be greater than the surrounding medium for wave confinement and guiding to occur, and on the further fact that a nematic liquid crystal is anisotropic, e.g., uniaxial, having one value of index of refraction in a direction perpendicular to the molecular axis and a greater value of index of refraction parallel to the molecular axis.

The liquid crystal of the invention is placed on the waveguide so that the lesser index of refraction is parallel to the E field of the wave propagating in the guide, and is of a material in which this index is less than that of the guide. When an electric field is applied across the crystal, in a manner to be explained more fully hereinafter, the molecules of the crystal align themselves with the electric field, and the greater index of refraction is parallel to the E field of the wave, the material being such that this index is greater than that of the guide. As a consequence, waveguiding action is completely cut off. Modulation is accomplished through variation in the electric field between the two extreme limits of molecular orientation of the crystal.

A mode filter can be created by replacing the liquid crystal with a similar solid uniaxial material. When a wave is propagating normal to the optic axis of the filter crystal and the refractive index along the optic axis is greater than that of the guide, a TE wave will see only this greater index and, consequently, will not propagate. In contrast, the TM wave will see the lower crystal index and since this index is assumed lower than the film index, the TM wave will propagate in the guide. By changing the orientation of the optical axis, TE waves instead of TM wawes can be made to propagate in the guide.

BRIEF DESCRIPTION OF THE DRAWING

The various features of the invention will be more readily apparent from the following detailed description and drawing, in which.

DETAILED DESCRIPTION

Figure 1:
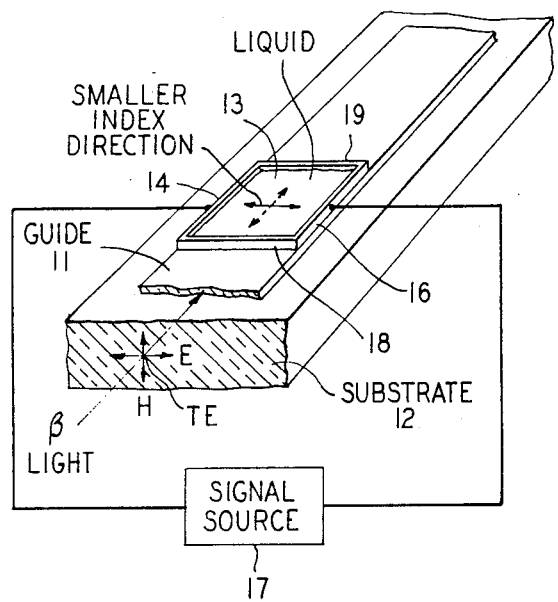
FIG. 1 is a perspective view of the switching device of the present invention.

FIG. 1 shows one of the devices of the present invention in a view in which a thin film optical waveguide 11 of suitable material such as glass and of index of refraction $n_1$ is mounted on a substrate 12 of suitable material such as a different glass of index of refraction $n_2$, where $n_1 > n_2$. Light is indicated as propagating along the guide by means of the vector $\beta$. The arrow E represents the electric field of the ligh light in the film and the arrow H represents the magnetic field. The section shown in FIG. 1 may be considered as having been lifted out of a thin film waveguide circuit, and it is not intended to indicate by the vector $\beta$ that light is being first introduced into the guide at its end, only that light is propagating in or through the guide in the direction of the vector. It is to be understood that the elements shown in FIG. 1 are not drawn to scale or to relative dimensions.

The vector $\beta$ representing the propagation of light in the guide can be thought of as being composed of two plane waves (the vectors $k$ in FIG. 2) which alternately bounce off the top and bottom of the guide as the light propagates. The plane which contains these $k$ vectors is known as the plane of incidence. When the E field of the light traveling in the guide is normal to this plane of incidence, the light is considered to be in the TE mode and when the H field is normal to the plane of incidence, the light is in the TM mode. In particular, the plane of incidence in FIG. 1 is defined by the H arrow and the $\beta$ vector. Therefore, the E field is normal to the plane of incidence and the light is in the TE mode.

Overlying the top surface of guide 11 over a portion of its length is a nematic liquid crystal element 13, of a material such as N-P-Butoxy-Benzylidene Amino Benzo Nitrile, which is characterized by having an index of refraction approximately 1.8 in a direction parallel to the molecular axis of the crystal and an index of approximately 1.5 in a direction perpendicular to the molecular axis. The material of guide 11 is chosen to have a refractive index $n_1$ of 1.6. One such material is Corning 7059 glass. On either side of the crystal 13 are electrodes 14 and 16, which are connected to a signal source 17, which may take any of a number of forms, depending on the particular function or operation to be performed. In FIG. 1 crystal 13 is also shown as being confined by a pair of end members 18 and 19, although in practice these are generally not necessary inasmuch as the crystal is normally held in place by its own surface tension. In addition, if desired, a glass plate, such as a microscope slide cover, not shown, may be placed over the crystal to hold it in place.

When crystal 13 is placed upon the surface of guide 11, it is given a molecular orientation such that the molecular axis is parallel to the direction of wave propagation. This may be done by rubbing the thin film surface. It is a characteristic of nematic liquid crystals, generally, that the molecules tend to align themselves in the direction of the rubbing, and thereafter maintain that alignment, or return to it if momentarily disturbed. This is a well known characteristic of such materials, although the exact mechanism involved is not clear.

In operation, when a TE mode optical wave propagates in the guide, its E field vector is as shown in FIG. 1. With the molecular axis of the crystal aligned with the direction of propagation, the E field "sees" an index of refraction $n_o$ normal to the molecular axis, that is less than the refractive index $n_1$ of guide 11. Hence the condition for confinement of the wave to the guide, namely $n_1 > n_o$, is fulfilled, and the wave propagates along the guide.

When a sufficiently large electric field is applied to electrodes 14 and 16 from source 17, the molecules of crystal 13 tend to align themselves with the field, thereby producing a rotation of the molecular axis through 90°. When this occurs, the E field of the wave "sees" a refractive index $n_e$ that is greater than that of the guide; that is, $n_e > n_1$, hence the necessary condition for waveguiding action does not obtain, and the wave ceases to propagate in guide 11. Removal of the electric field results in a rotation of the molecular axis back to its original state, and wave propagation is resumed. This switching or pulsing action, for the materials mentioned in the foregoing, is achieved with an applied field of approximately 500 V/mm. Amplitude modulation of the wave can be achieved by operation with voltages between the limits of 0 and 500 V/mm for the materials specified. It is to be understood that other materials may also be used provided the crystalline material has one refractive index less than that of the material of the guide 11 and another refractive index that is greater. It should be noted that throughout this operation the E field of a TM wave would be normal to the molecular axis and would continue to propagate in the guide despite the rotation in index of refraction.

From the foregoing it can be seen that the device of the present invention is relatively simple, and can be placed in any desired location along the guide. Just as importantly, it is not permanently affixed to the guide, hence it may be relocated when desired.

It has been found that the device of FIG. 1 is also useful for mode conversion. With proper choice of the various parameters such as refractive indices and guide dimensions as well as applied voltages, it is possible to convert from the TE to the TM mode and vice versa.

Figure 2:
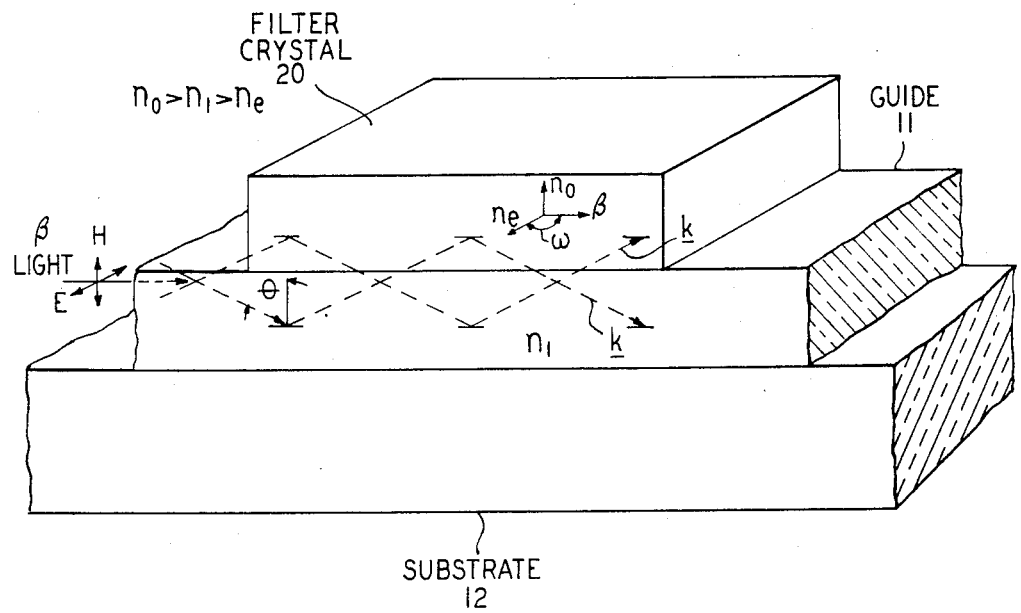
FIG. 2 is a perspective view of the mode filtering device of the present invention.

FIG. 2 shows a side view of the mode filtering device of the present invention. The structure of this device is essentially the same as the device shown in FIG. 1, and similar parts have the same numerical designation. The two devices differ in that the liquid crystal 13, electrodes 14 and 16, and signal source 17 of FIG. 1 are replaced by a filter crystal 20 in FIG. 2. The crystal selected for filtering must be anisotropic with its ordinary index of refraction, $n_o$, and its extraordinary index of refraction, $n_e$, bracketing the index of refraction of the guide, $n_1$. When a material such as vinyl trimethysilane with an index of 1.53 is chosen as the guide material, calcite with an ordinary index of 1.656 and an extraordinary index of 1.485 would be suitable. However, it should be noted that the important condition is that the two indices ($n_o$ and $n_e$) lie on opposite sides of the index of the guide, and not that the material is negative uniaxial ($n_o > n_e$). Therefore, a positive uniaxial material such as potassium dithionate, with $n_o = 1.46$ and $n_e = 1.52$ would also be suitable, with a guide having $n_1 = 1.49$.

As in FIG. 1, the light traveling in the guide 11 is indicated by the vector $\beta$. The $k$ vectors, which comprise the $\beta$ vector as previously explained, are also indicated. Since the E field is indicated as being normal to the plane formed by these $k$ vectors, the plane of incidence, the guided wave is in the TE mode. The filter crystal 20 is oriented so that its optical axis, which is in the $n_e$ direction, is parallel to the E field of the light in the guide and normal to the H field. The angle $\omega$ between the direction of propagation $\beta$ and the optical axis is equal to 90°. Assuming that a negative uniaxial material is used as the filter crystal, the TE wave will find the condition $n_1 > n_e$ at the interface between the guide and the filter crystal. Provided the angle $\theta$ exceeds the critical angle, the TE wave will be confined to the guide. A TM wave, on the other hand, will find the condition $n_1 < n_o$, thereby allowing part of it to escape the guide and part to be reflected back into the guide. After the TM wave comes into contact with the interface plane a number of times, it is completely eliminated from the guide.

When the filter crystal is rotated 90° so that the optical axis is parallel to the H field and normal to the E field, the TE wave will find the condition $n_1 < n_o$ and it will be eliminated from the guide. The following table specifies which mode will be filtered out by the device of FIG. 2.

TABLE

Relationship Between the Optic

| Axis and Interface Plane | Crystal Type | Filtered Mode |
|---|---|---|
| Normal | Positive | TM |
| Normal | Negative | TE |
| Parallel | Positive | TE |
| Parallel | Negative | TM |

In the situation where the optic axis is normal to the interface plane between the two materials, mode propagation in any direction is allowed. However, when the optic axis is parallel to the interface plane, the device will support propagation only when $\omega = 90°$. When this condition is not maintained, mode conversion will take place at the interface plane. Since one of the modes is being filtered and the other is being partially converted into the filtered mode, both modes will eventually decay.

It is to be understood that the foregoing is illustrative of the principles of the present invention, and that numerous modifications or variations of the devices illustrated may occur to workers in the art without departing from the spirit and scope of the invention.

I claim:

1. An optical device for filtering light from a thin-film waveguide comprising:
   a thin-film optical waveguiding member of index of refraction $n_1$; and
   a second member forming an interface with said thin-film waveguiding member along at least a portion of the length thereof, said second member being a uniaxial crystal having an optic axis with one value of index of refraction $n_0$ in a direction normal to the optic axis and a different value of index of refraction $n_e$ parallel to the optic axis, the index of refraction of said thin-film waveguiding member $n_1$ having a value between the respective values of $n_0$ and $n_e$ of said second member, the optic axis of said second member being oriented with respect to the interface between said thin-film waveguiding member and said second member so that one polarization mode of the light propagating in said thin-film waveguiding member encounters an index greater than $n_1$ at the interface and the other polarization mode encounters an index less than $n_1$.

2. An optical device as claimed in claim 1 wherein said second member is calcite.

3. An optical device for filtering light from a thin-film waveguide comprising a thin-film optical waveguiding member of index of refraction $n_1$ and a second member forming an interface with said thin-film waveguiding member along at least a portion of the length thereof, said second member being a nematic liquid crystal having a molecular axis with one value of index of refraction $n_0$ in a direction normal to the molecular axis and a different value of index of refraction $n_e$ parallel to the molecular axis, the orientation of the molecular axis of said liquid crystal being variable in response to an applied electric field, and means for varying the waveguiding properties of said thin-film waveguiding member comprising means for applying an electric field to said liquid crystal to vary the orientation of the molecular axis thereof.

4. An optical device as claimed in claim 3 wherein said second member is N-P-Butoxy-Benzylidene Amino Benzo Nitrile.

* * * * *